(12) United States Patent
Whitcomb et al.

(10) Patent No.: US 6,169,614 B1
(45) Date of Patent: Jan. 2, 2001

(54) WEDGED-SHAPE HOLOGRAPHIC COLLECTOR

(75) Inventors: Kevin J. Whitcomb, Shrewsbury, MA (US); Brian M. McMaster, Pittsford, NY (US); Alan Shearin, Portland, OR (US); Anna M. Dean, Webster, NY (US)

(73) Assignee: PSC Scanning, Inc., Eugene, OR (US)

( * ) Notice: Under 35 U.S.C. 154(b), the term of this patent shall be extended for 0 days.

(21) Appl. No.: 09/316,030

(22) Filed: May 21, 1999

(51) Int. Cl.[7] .............................. G02B 5/32; G02B 5/18; G02B 6/34; G06K 7/10
(52) U.S. Cl. ....................... 359/15; 359/575; 235/457; 235/467; 235/473; 250/227.11; 250/227.32; 385/37
(58) Field of Search .................. 359/15, 16, 17, 359/566, 569, 571, 574, 575; 235/457, 467, 473; 250/227.11, 227.32; 385/37

(56) References Cited

U.S. PATENT DOCUMENTS

| | | |
|---|---|---|
| 4,400,616 | 8/1983 | Chevillat et al. .................. 235/487 |
| 5,013,133 | 5/1991 | Buralli et al. .................. 350/162.11 |
| 5,019,698 | 5/1991 | Eastman .................. 235/462 |
| 5,101,184 | 3/1992 | Antes .................. 235/454 |
| 5,200,597 | 4/1993 | Eastman et al. .................. 235/455 |
| 5,212,371 | 5/1993 | Boles et al. .................. 225/472 |
| 5,231,277 | 7/1993 | Aritake et al. .................. 235/462 |
| 5,237,161 | 8/1993 | Grodevant .................. 235/462 |
| 5,258,604 | 11/1993 | Behrens et al. .................. 235/462 |
| 5,266,788 | 11/1993 | Yamazaki et al. .................. 235/467 |
| 5,410,139 | 4/1995 | Barkan .................. 235/462 |
| 5,714,750 | 2/1998 | Eastman et al. .................. 235/462 |
| 5,786,585 | 7/1998 | Eastman et al. .................. 235/472 |

Primary Examiner—Jon Henry
(74) Attorney, Agent, or Firm—Foley & Lardner

(57) ABSTRACT

A diffractive collector for an optical scanner includes a wedged-shaped substrate having holographic grating provided on a front surface, a conical-shaped back surface, and at least one detector. Substantially parallel light is made incident upon the front surface of the substrate, and the light is diffracted within the substrate to the back surface. The wedged shaped of the collector and the holographic grating cause the light to reflect back within the substrate at such an angle that the light remains within the substrate as the light propagates to the at least one detector.

17 Claims, 12 Drawing Sheets

WEDGED-SHAPE HOLOGRAPHIC COLLECTOR

BACKGROUND OF THE INVENTION

1. Field of the Invention

The present invention relates to a diffractive collector for a bar code scanner. In particular, the present invention relates to a wedged-shaped collector which includes a planar front surface and a holographic grating provided on a conical bottom surface.

2. Description of the Related Art

Bar codes are used in a wide variety of applications for retrieving information, such as price, from objects. In this respect, bar code scanners are of widespread use in grocery stores and department stores, for both inventory control and for point-of-sale (POS) transactions.

A bar code normally includes several bar code characters. A bar code character is a group of lines (bars) and spacings that represent a single number or letter. A bar code symbol is a collection of several bar code characters which represent an identification of a particular object. The lines of the bar code can vary, for example, in a range from about ⅛" to 1 in height, and from about 1 to 50 mils in thickness. The spacings between the lines making up the bar code may be of various widths, with the variations in the spacing being one determination of the type of bar code characters making up the bar code.

Typically, bar codes are read by illuminating the bars and spacings in a sequential manner, with the bars absorbing light and the background spacings reflecting light. This results in a pattern of reflections and nonreflections that is sensed by a light detecting circuit resident in the bar code scanner. The light detecting circuit provides an input to a digital processor, which interprets the bar code into a digital word.

Various types of apparatuses are used for the light detecting circuits in bar code scanners. For example, a photodiode detector may be used to detect reflected light off of a bar code symbol. The photodiode detector generates an electrical signal indicative of the detected light intensity. The electrical signal is then output to signal processing circuitry, which processes the electrical signal and generates data descriptive of the symbol.

In general, light output by a light sensor within the bar code scanner impinges on a bar code symbol, causing some light to reflect off of the bar code symbol. Some of the reflected light is received by a mirror (typically a curved mirror) within the housing of the bar code scanner (but positioned behind a window that allows for light to pass therethrough). The mirror focuses the received light onto the photodiode detector. Such a system is described in U.S. Pat. No. 5,410,139, entitled "Peak Detecting Bar Code Reader", issued to W. Barkan, which is incorporated herein by reference. In essence, the mirror acts as a "collector" for the reflected light, and outputs the collected light to the photodiode detector. A signal indicative of the amount of the received reflected light is thereby obtained.

Other detailed designs of bar code reading instruments are described in U.S. Pat. No. 5,258,604, which was issued to James Behrens et al. on Nov. 2, 1993, and is entitled "Bar Code Scanner"; U.S. Pat. No. 5,237,161, which was issued to Scott R. Grodevant on Aug. 17, 1993 and is entitled "System for Automatically Reading Symbols, Such as Bar Codes, on Objects Which are Placed in the Detection Zone of a Symbol Reading Unit, Such as a Bar Code Scanner"; U.S. Pat. No. 5,212,371, which was issued to John A. Boles et al. on May 18, 1993 and is entitled "Hand Held Bar Code Scanner with Improved Aiming Means"; U.S. Pat. No. 5,200,597, which was issued to Jay M. Eastman et al. on Apr. 6, 1993 and is entitled "Digitally Controlled System for Scanning and Reading Bar Codes"; and U.S. Pat. No. 5,019,698, which was issued to Jay M. Eastman et al. on May 28, 1991 and is entitled "Bar Code Reading System Having Electrical Power Conservation and Laser Radiation Power Limiting Means." The entire contents of all of the patents and patent applications listed above are incorporated herein by reference. This application and the all of the above-identified patent applications and patents, except for the Barkan patent, are assigned to PSC Inc. (Webster, New York).

Holograms are currently being used for a variety of security-related purposes for smart cards. U.S. Pat. No. 5,101,184, entitled "Diffraction Element And Optical Machine-Reading Device", issued to G. Antes, relates to the use of a hologram on a card, such as a credit card or bank note, so as to provide a measure of security for the card. The invention also relates to a device for reading the information on the card.

U.S. Pat. No. 4,400,616, entitled "Document Card Containing Information In Holographic Form", issued to P. Chevillat et al., relates to a document card provided with secret data contained ill the form of a waveguide hologram, and a device for reading the secret data.

One conventional bar code scanner utilizes holograms for outputting light to a bar code symbol. U.S. Pat. No. 5,266,788, entitled "Laser Scanner For Bar Code Reader Having a Transparent Light Guide Plate", issued to K. Yamazaki et al., which is incorporated herein by reference, describes such a conventional scanner.

FIG. 1 shows the use of a hologram for providing a output scan signal according to the Yamazaki invention. In FIG. 1, a transparent light guide plate 23 is integrally formed on a substrate 20, and a scanning beam emission window 25 is formed as a hologram at an upper part of the light guide plate 23. The substrate 20 incorporates a scanning optical system for the scanning beam P. Yamazaki's scanning optical system has a polygonal mirror 31, which is rotated around a rotary shaft 33 by a motor 35. In response to the rotation, the polygonal mirror 31 guides the beam P in a plane within the substrate 20, so that the beam is reflected upward from a lower mirror 37a into the transparent light guide plate 23. The scanning beam P undergoes repeated total reflections inside the transparent light guide plate 23, and is diffracted by the hologram 27 in a predetermined direction and emitted from the emission window 25. The emitting direction is optionally set according to the design of a desired pitch of interference fringes, etc., of the hologram 27. In Yamazaki's invention, the light source of the scanning beam P is a semiconductor laser 41, and the beam P is made incident on the polygonal mirror 31 from the inside of the substrate 20.

FIG. 2 shows another embodiment of Yamazaki's invention, in which a hologram 38 is arranged at a lower end portion of the transparent light guide 23. The hologram 38 diffracts the scanning beam P from the polygonal mirror 31 in a predetermined direction to guide the beam upwardly into the transparent light guide plate 23.

Another conventional bar code scanner utilizes holograms for both outputting light to a bar code symbol, and for receiving light that is reflected off of the bar code symbol. U.S. Pat. No. 5,231,277, entitled "Optical Scanner Using Plannar Reflecting Holograms", issued to H. Aritake et al., which is incorporated herein by reference, describes such a conventional scanner.

FIG. 3 shows a conventional bar code scanner according to Aritake, in which a rotary polygon mirror is employed as a laser beam scanning means and strip holograms of the transmission type are employed for a reading window. The reading window 10 is composed of three transparent substrates 11, 12 and 13 having strip holograms 11a, 12a and 13a, respectively, of the transmission type formed in different directions from each other and adhered in layers to each other such that the strip holograms 1a, 12a and 13a extend in an intersecting relationship to each other. Located below the reading window 10 are a scanning pattern generating mirror means 14 which consists of three side mirrors 15, 16 and 17, a concave mirror 18 having a through-hole 18a formed therein, a bottom mirror 19 disposed in parallel to the reading window 10, a photo-detector 20, a mirror 21, and a polygon mirror 23 having five reflecting faces and connected to be driven to rotate by a motor 22. A laser beam outputs a light beam that is projected onto the reading window 10 by way of the mirrors 15, 16 and 17 and the bottom mirror 19 to successively scan the three strip holograms 11a, 12a and 13a. The laser beams diffracted by any of the strip holograms 11a, 12a and 13a are projected as scanning lines of predetermined spacings, and a desired scanning pattern is formed as a result.

Also, as shown in FIG. 4, signal light from a bar code affixed to a commodity is diffracted by the reading window 10 and introduced to the bottom mirror 19, and then reflected successively by the bottom mirror 19, side mirror 16, and polygon mirror 23 so that it is introduced to the concave mirror 18. The scattered light is condensed and reflected by the concave mirror 18 and then introduced by way of the mirror 21 into and detected by the photo-detector 20.

The above-mentioned device, however, requires three horizontally divided side mirrors incorporated below the reading window, in which the reading window itself has three transparent substrates that form respective strip holograms. In view of this, Aritake discloses a system as shown in FIG. 5, in which a hologram 34 of the reflection type is used for generation of a scanning pattern. The hologram 34 is used with a concave mirror 18 having a through-hole 18a formed therein and having a curved reflecting face, a photo-detector 20, a reflecting mirror 21, a polygon mirror 23' having six reflecting faces, and connected to be driven by a motor 22, a laser tube 24, a beam shaper 25 and another reflecting mirror 26, that are disposed below a reading window in a substantially similar fashion to the device shown in FIG. 3.

The reflection type hologram 34 comprises three strip holograms 35, 36 and 37 of the reflection type having different diffraction directions from each other, and which are disposed in a vertically overlapping relationship in the same vertical plane. Each of the strip holograms 35, 36 and 37 has interference fringes formed therein such that they may diffract a scanning beam introduced thereto from the polygon mirror 23' so as to irradiate the scanning beam upon strip holograms (not shown) of the transmission type of the reading window 30 from below. In producing a hologram of the reflection type, a reference beam is introduced to one face of a photographic plate in the same direction with a laser beam which is to be used upon reproduction of a hologram while an object beam is introduced to the other face of the photographic plate in such a direction that a desired scanning line may be formed on the reading window upon reproduction of the hologram. With this method, a hologram having an arbitrary diffraction angle can be produced.

FIG. 6 shows another embodiment of the use of a hologram in the Aritake patent. Scattered signal light S1 from the bar code 50a advances reversely along the substantially same light path with the incident beam and is introduced to the hologram 55 of the reflection type having a concave mirror. Diffracted light S2 from the hologram 55 is condensed by way of a mirror 21 to a photo-detector 20 so that the bar code information is read by the photo-detector.

U.S. Pat. No. 5,714,750, issued to Jay Eastman et al., and assigned to PSC Inc., which is incorporated herein by reference, describes the use of concentric, circular-shaped holographic gratings which provide the means for guiding return light to a photodetector positioned at a central point with respect to the concentric circular gratings. As a result, a miniaturized collector for a bar code scanner can be constructed.

U.S. Pat. No. 5,786,585, issued to Jay Eastman et al., and assigned to PSC Inc., which is incorporated herein by reference, describes the use of diffraction gratings on a collector of a bar code scanner. The diffraction gratings vary in width depending upon where their location on a front surface of a substrate. Due to the diffraction gratings, the return light is focussed onto a particular area, where a detector is situated.

It is desirable to utilize a hologram in a collector for receiving light reflected off of a scanned bar code symbol, such that the collector is compact in size and not as complex as the conventional devices described above.

SUMMARY OF THE INVENTION

An object of the invention is to provide a collector that is of a compact size so as to fit in all sizes of optical scanners.

A further object of the invention is to utilize a holographic grating in a collector so as to send reflected light to a detector.

It is a father object of the invention to provide a structure to provide for useful scanning of a rotor within an optical scanner even when a shock is provided to an optical scanner.

At least one of the above-mentioned objects are achieved by a collector for an optical scanner. The collector includes a wedged shaped substrate having a first side and a second side. The collector also includes a holographic grating provided on the first side of the wedged shaped substrate. Light that is incident onto the first side of the wedged shaped substrate diffracts into the wedged shaped substrate to the second side and then back to the holographic grating on the first side. The light is reflected within the wedged shaped substrate to a bottom end of the wedged shaped substrate, where a collector is positioned to receive the light.

At least one of the above-mentioned objects are achieved by a mounting assembly for an optical scanner. The mounting assembly includes a base unit having a region with a hole disposed therein. The mounting unit also includes flexures having a first end connected to the base unit and having a second end. The mounting unit further includes a rotor unit that includes a collector, a laser light source, and a post, the rotor unit being rotatable with respect to the base unit by way of connection of the rotor unit to the second ends of the flexures. The post of the rotor unit is fitted into the hole of the base unit to limit translational movement of the rotor unit due to a shock force applied to the optical scanner.

BRIEF DESCRIPTION OF THE DRAWINGS

These and other objects and advantages of the invention will become more fully apparent from the following detailed description when read in conjunction with the accompanying drawings with like reference numerals indicating corresponding parts throughout, and wherein.

DETAILED DESCRIPTION OF THE PREFERRED EMBODIMENTS

A diffractive collector according to a first embodiment of the invention is shown in FIGS. 7–14. The diffractive collector can be used in a bar code scanner or other type of optical scanner, and is of a compact size so as to easily fit into all types of scanners, including miniaturized scanners.

Figure 1:
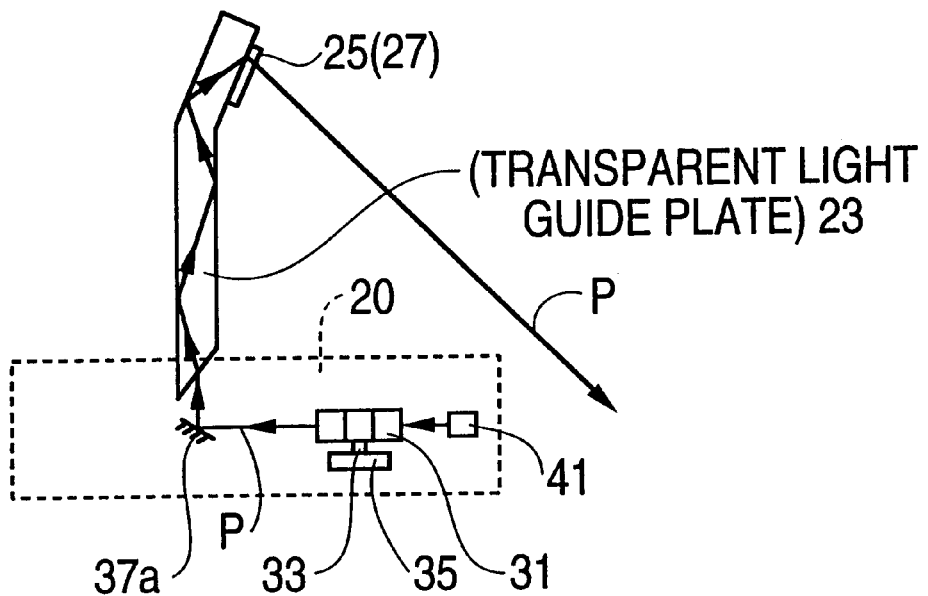
FIG. 1 shows a conventional scanner that uses a hologram to create a scanning beam.
Figure 2:
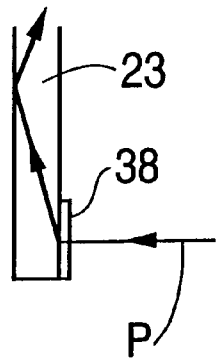
FIG. 2 shows another conventional scanner that uses a multi-partitioned hologram to create a scanning beam and to receive return light from a scanned object.
Figure 3:
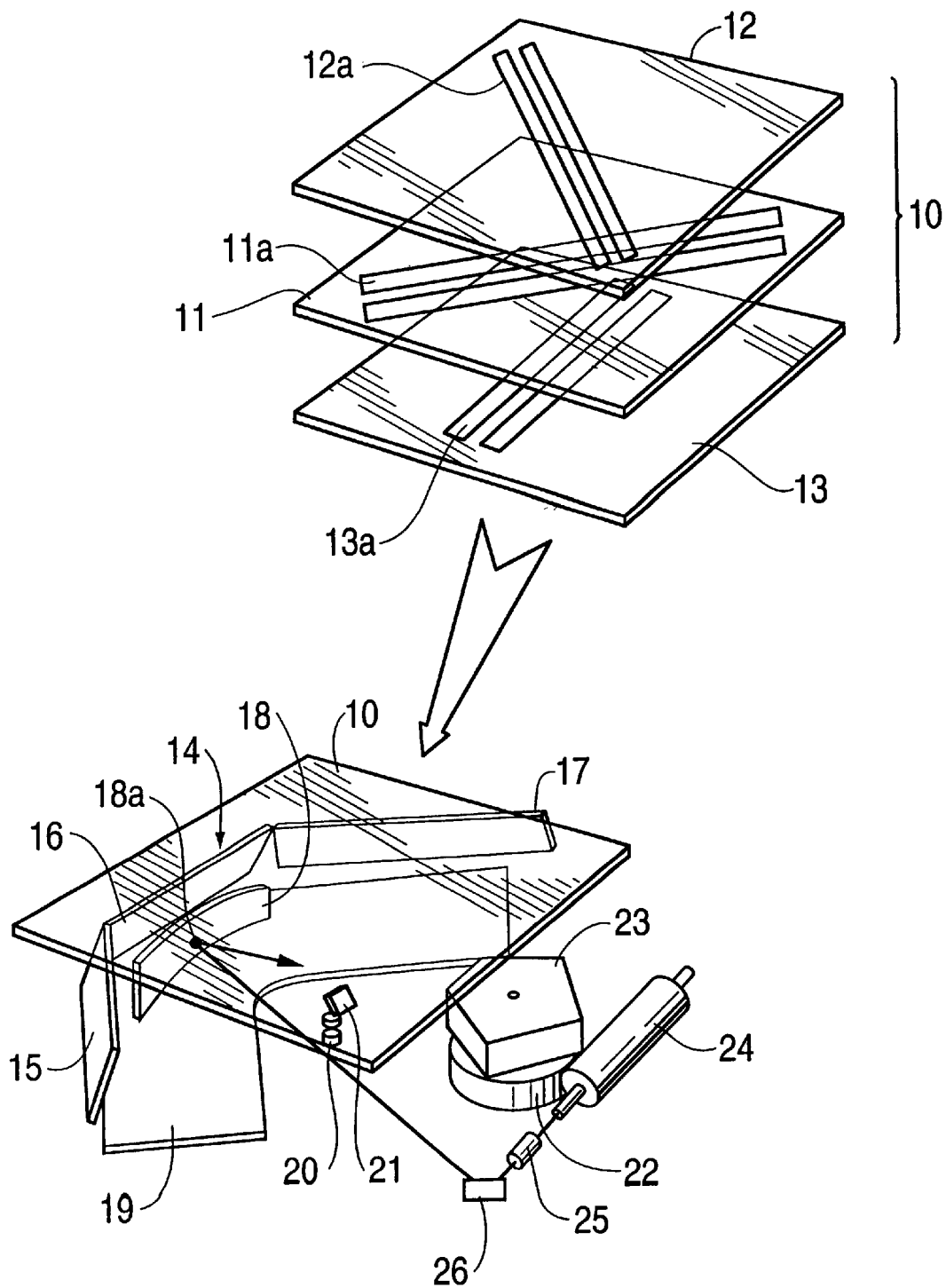
FIG. 3 shows still another conventional scanner that uses a hologram.
Figure 4:
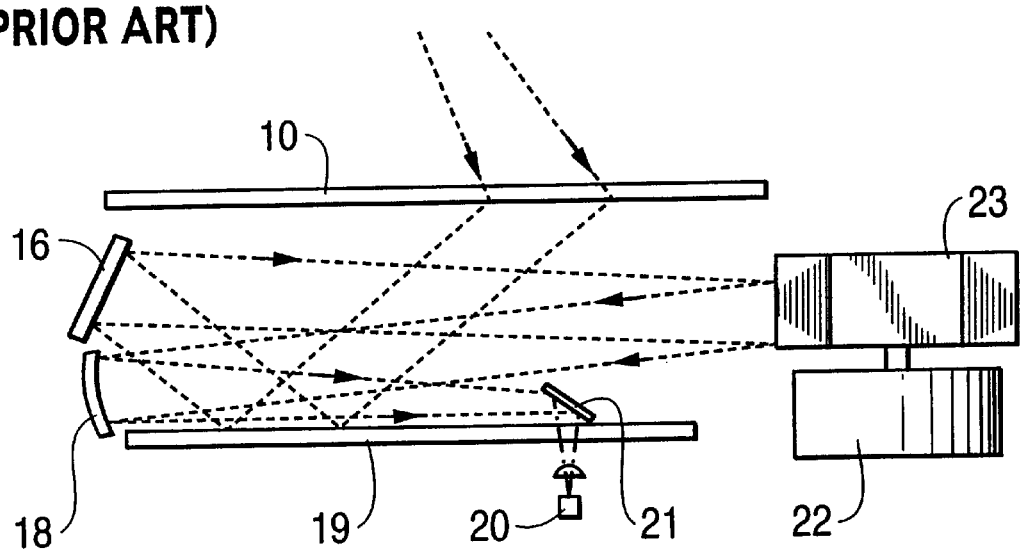
FIG. 4 shows the reflection of light within a housing of the conventional scanner of FIG. 3.
Figure 5:
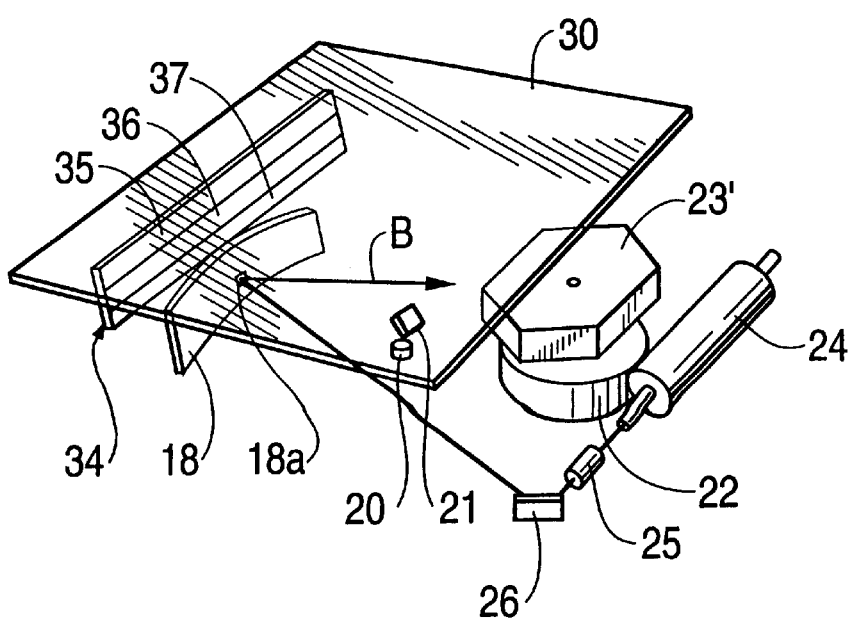
FIG. 5 shows still another conventional scanner that uses a hologram.
Figure 6:
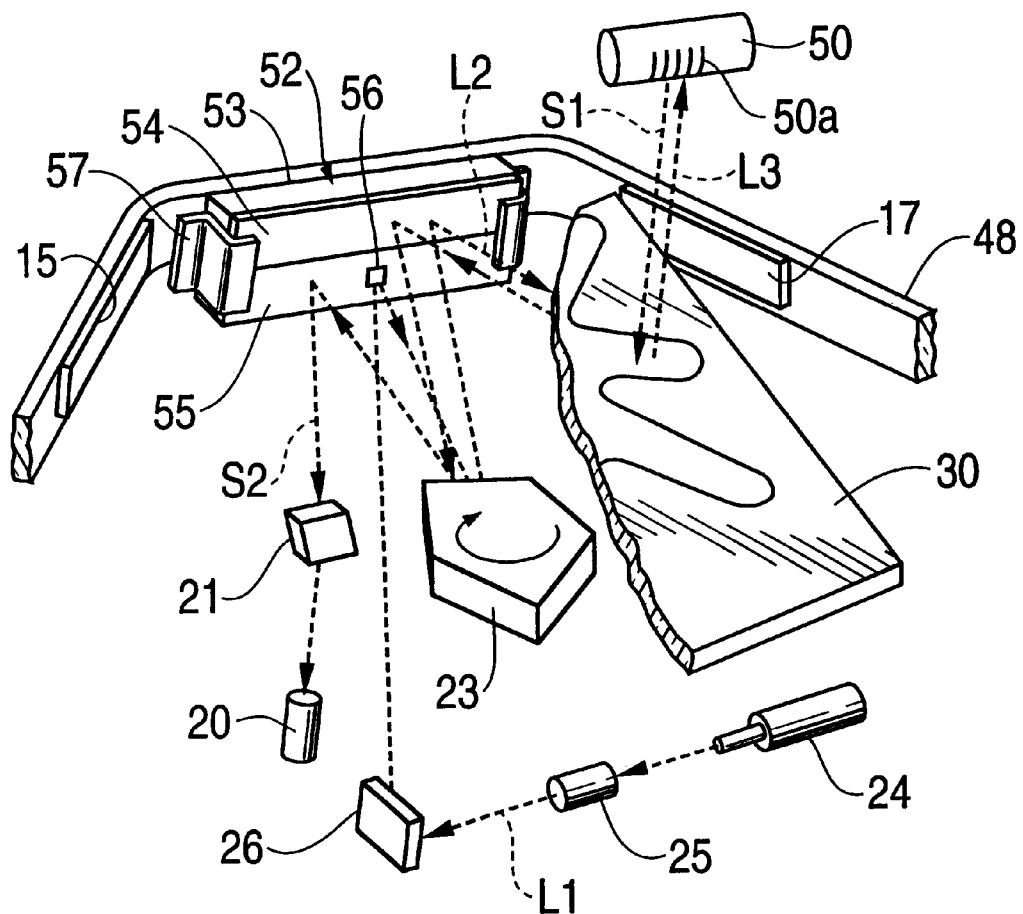
FIG. 6 shows even yet another conventional scanner that uses a hologram.
Figure 7:
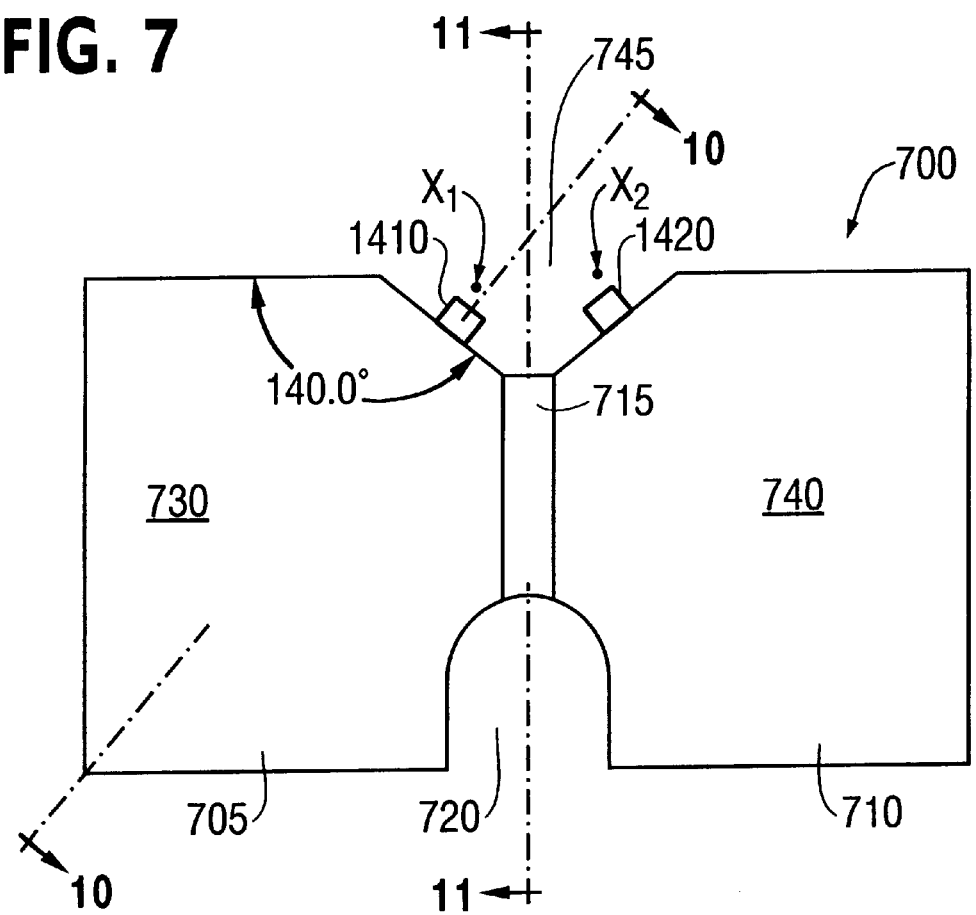
FIG. 7 corresponds to a bottom view of a collector according to a first embodiment of the invention.

As shown in FIG. 7, the diffractive collector 700 includes a first wedged-shaped substrate region 705, a second wedged-shaped substrate region 710, and a spacer (or mounting part) 715 disposed between the first and second wedged-shaped substrate regions 705, 710. The spacer 715 is fitted within a trough-like opening between the substrate regions 705, 710, and provides for connection of the collector to a flexure, motor, or other structure within an optical scanner. The substrate regions 705, 710 are connected together by virtue of a common front surface 750 being shared by these two regions, as shown best in FIG. 9.

The collector 700 includes an open, arch-shaped area 720, in which a laser diode assembly (not shown) is fitted thereto. Accordingly, during a scanning operation of a bar code scanner which houses the collector 700, the laser diode assembly (which outputs light towards a bar code symbol or object) and the collector 700 (which receives light reflected off of the scanned bar code symbol or object) are always pointing in substantially the same direction.

Figure 8:
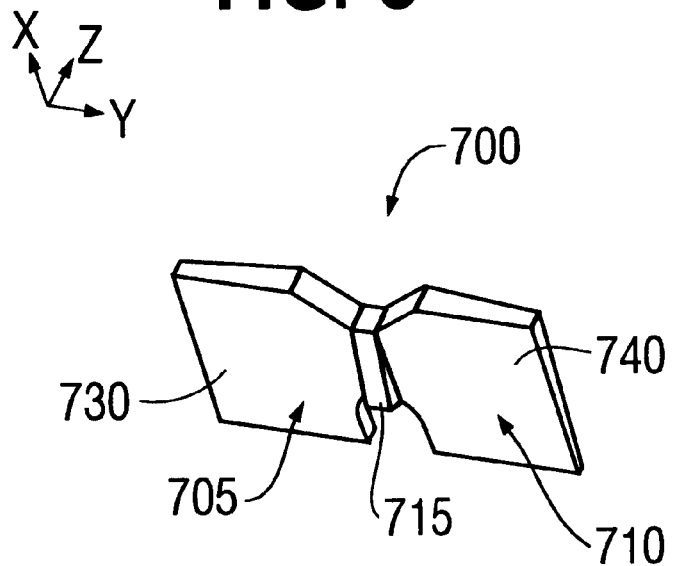
FIG. 8 corresponds to a plan view showing a bottom surface of the collector according to the first embodiment of the invention.
Figure 9:
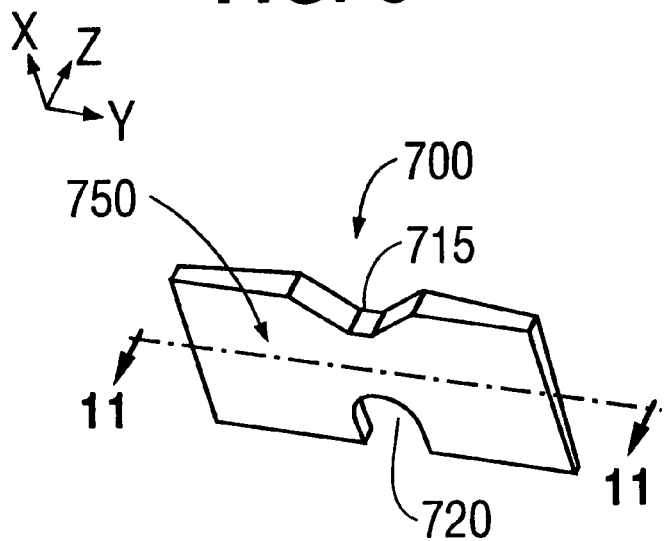
FIG. 9 corresponds to a plan view showing a front surface of the collector according to the first embodiment of the invention.
Figure 12:
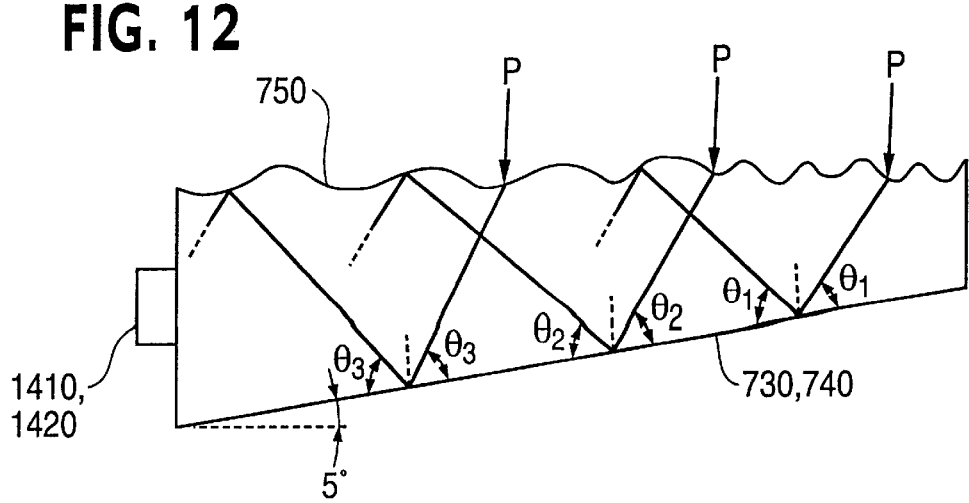
FIG. 12 shows a side view of the collector according to the first embodiment of the invention.
Figure 13:
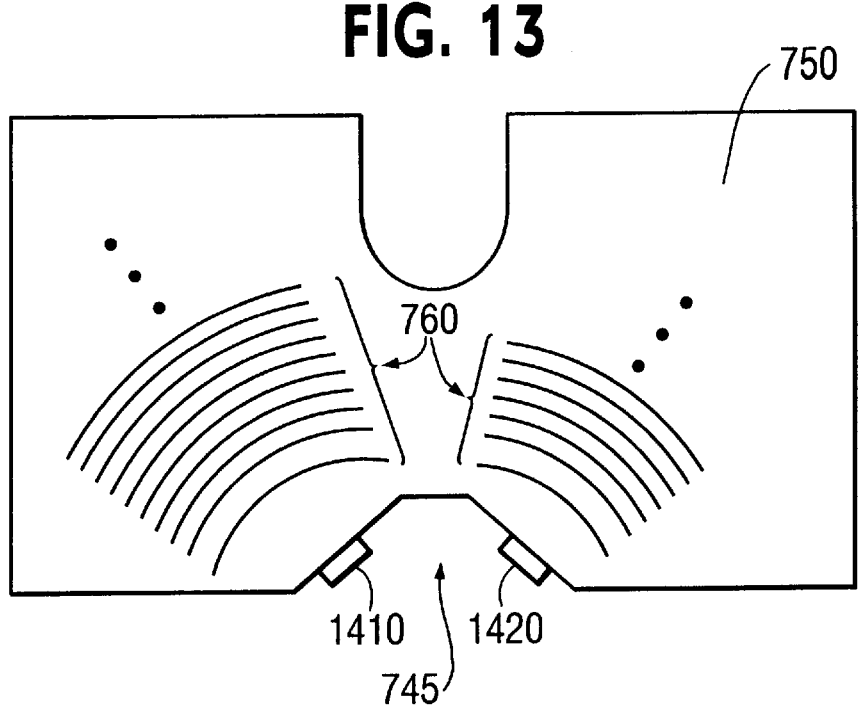
FIG. 13 shows the interference fringe pattern on the front surface of the collector according to the first embodiment of the invention.

Each substrate region 705, 710 has a flat or planar front surface 750, and a conical or wedge-shaped back surface 730, 740, as seen best from FIGS. 8 and 9. The front surface 750 has diffraction gratings provided thereon by, for example, an embossing, etching or lamination procedure, so as to provide a hologram on the front surface 750. FIG. 12 shows a cross-sectional view of the collector 700, in which the wavelike nature of the front surface 750 is clearly shown. FIG. 13 shows a top view of the collector 700, which shows the cylindrical interference fringe pattern of the holographic grating 760 that has been provided on the front surface 750. As shown in FIGS. 12 and 13, the spatial frequency of the holographic grating increases as the distance from the triangular-shaped opening 745 increases.

The periodicity of the holographic grating is sometimes called the grating frequency. In the invention, the grating frequency increases along the length of the front surface 750 in a direction away from the photodetectors, which correspond to the focus point for the grating pattern.

The design of the holographic grating may follow known technology. The spacing (1/v) of the fringe planes as they intersect the surface of the holographic grating define the grating dispersion. This diffracts light in accordance with the standard grating equation in an equivalent manner as a classical surface-relief grating. The equation for a transmission holographic grating can be represented by $$mv\lambda = \sin(\alpha) - \sin(\beta)$$

where m is the order of diffraction, v is the grating frequency, $\lambda$ is the free space wavelength, and $\alpha$ and $\beta$ are the incidence and diffraction angles in air. Reference may be had to U.S. Pat. No. 5,013,133 issued May 7, 1991 to D. A. Buralli et al., entitled "Diffractive Optical Imaging Lens System", and to patents and literature cited and discussed therein, for further information as to the design of diffractive grating lenses.

As shown in FIG. 13, a first photodetector 1410 and a second photodetector 1420 are positioned within the opening 745, so as to receive light that has been collected by the first and second substrate regions 705, 710, respectively. In the first embodiment, the first and second photodetectors 1410, 1420 are indexed-matched to the first and second substrate regions 705, 710, to thereby maximize the percentage of light that is provided from the regions 705, 710 to be detected by the photodetectors 1410, 1420. In the first embodiment, the output of the two photodetectors is summed. The summed value is indicative of the characteristics of the light reflected off an object, such as a bar code label.

Figure 11:
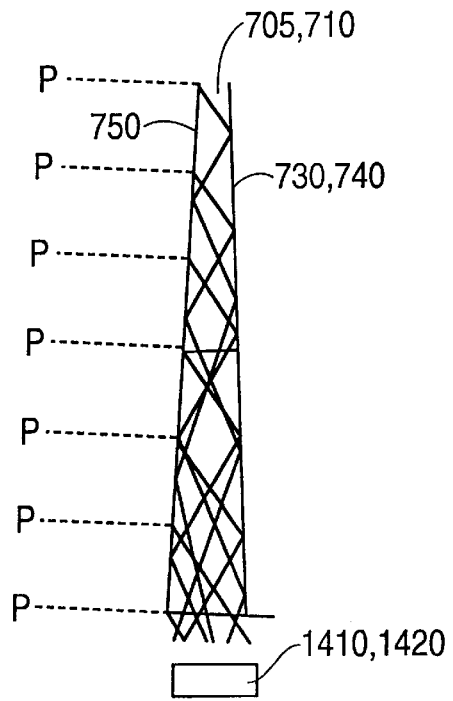
FIG. 11 shows a cross-sectional view along line 11—11 of FIG. 9.

As shown in FIG. 11, light reflected off of an object, such as a bar code label, is incident on the front surface 750 of the substrate regions 705, 710. That light is labeled as 'P' in FIG. 12. Due to the holographic grating 750, the light is diffracted to surface 730, 740 and then reflected towards the surface 750. The light remains within the collector 700 as it reflects between the top and bottom surfaces and eventually makes its way to the photodetectors 1410, 1420. The exact path of the diffracted light is strongly dependent upon the holographic design. The depth of the grating, the depth of the fringe structure and the angular and spectral components of the incident light and their relationship with the Bragg condition determine the diffracted order. In the case of a plane, parallel grating with fringes normal to the surface, the Bragg condition is given by:

$$m\lambda = \Lambda 2 n_2 \sin(\alpha_{2B})$$

The fringe spacing is $\Lambda$, $n_2$ is the hologram medium refractive index, and the Bragg angle for the grating medium is $\alpha_{2B}$. The Bragg condition is met for integer value of m and when the fringe spacing and wavelength define equal and opposite angle of incidence and diffraction. For the first embodiment of the holographic collector, the fringes are slanted and formulation of the Bragg condition is more complex. The principal factor is that the incidence and diffraction angles are symmetric within the medium and about the fringe planes. Near the Bragg condition, there is a range of angles for which light will be efficiently diffracted. There also exists a wavelength envelope in which efficient diffraction occurs. Light is transmitted without diffracting when the Bragg condition is not satisfied. The first embodiment of the holographic diffraction grating has tilted fringes. It operates at 650 nm with normal incident light and a diffraction angle of 40°. The fringe spacing is on the order of 4000 lines/mm. Of course, one of ordinary skill in the art will recognize that other designs that operate at different wavelengths and/or diffraction angle and/or fringe spacing may be utilized while remaining within the scope of the invention.

The light that is refracted into the substrate regions 705, 710, traverses inside these regions 705, 710, as shown in FIG. 11, and makes its way to the respective bottom surfaces 730, 740. The light becomes incident on the conically-shaped bottom surfaces 730, 740, and is reflected off of the bottom surfaces 730, 740, and back towards the front surface 750, as seen best in FIG. 11.

The angle of reflection at the bottom surfaces 730, 740 is the same as the angle of incidence of the light impinging on the bottom surfaces 730, 740. The bottom surfaces 730, 740 are offset with respect to the front surface 750 due to the conically-shaped nature of the bottom surfaces 730, 740, as well as the wedge shape of the collector 700. That offset angle ensures that the light incident on the bottom surfaces 730, 740 is greater than the angle of total internal reflection (TIR) for the collector 700. The TIR angle is the angle at which light incident at a surface at an angle that is greater than the TIR value is totally reflected within the element, and in which light incident at a surface at an angle that is less than or equal to the TIR value is not totally reflected within the element (and therefore some of the light is diffracted outside of the element).

The 5° wedge shape of the collector 700 helps retain the light within the collector 700, by further increasing the angle at which the light P propagates through the substrate regions 705, 710. This places the light P at such an incidence angle to the bottom surfaces 730, 740 and the holographic grating 760 so that the light P is not incident at Bragg conditions. Thus, the light P does not couple out of the substrate regions 705, 710, and the light P is trapped within the substrate regions 705, 710 and directed to the detectors. In the first embodiment, the detectors are index-matched to the substrate regions 705, 710, so as to decrease the loss of light at the boundary between the substrate regions 705, 710 and the detectors.

After reflecting off the bottom surfaces 730, 740, the light then travels back to the front surface 750, where it makes contact with the holographic grating 760 at a different point on the grating than at which that light was initially incident on the front surface 750. This second incident point on the front surface 750 is closer to the photodetectors disposed within the opening 745, and is a point at which the spatial frequency of the holographic grating is less than the initial-incidence point. This results in an angle of reflection back towards the bottom surface that is greater than the angle at which the light was initially directed towards the bottom surface when that light first made contact with the holographic grating.

This process is repeated until the light arrives at a corresponding one of the photodetectors 1410, 1420, where it is received and the light is detected.

Figure 14:
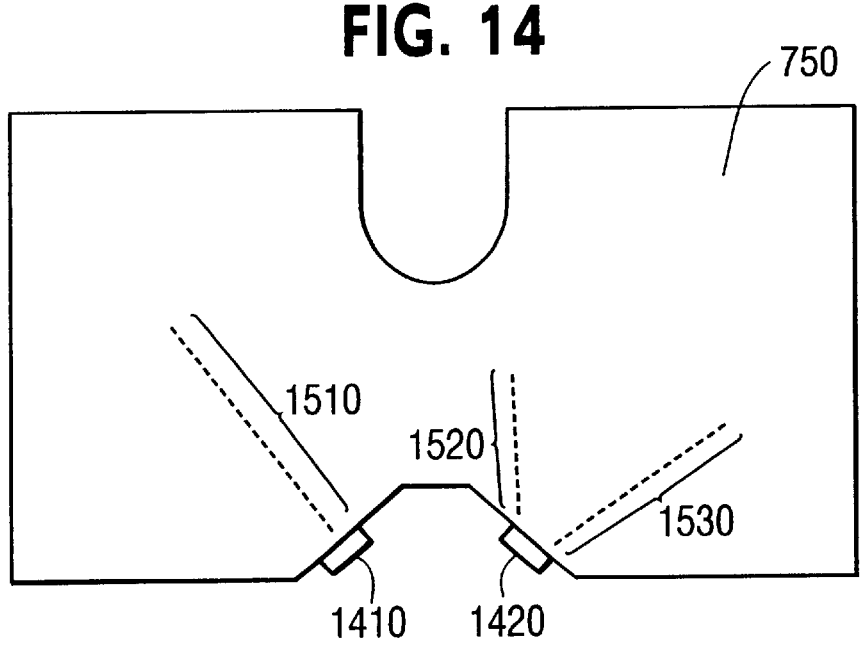
FIG. 14 shows the reflection pattern of light as it traverses within the collector according to the first embodiment of the invention.

FIG. 14 shows a series of dots in three separate lines 1510, 1520, 1530. The top-most dot in each of those lines 1510, 1520, 1530 represents the point on the front surface 750 at which light was initially incident on the front surface 750. The other points in each of the three separate lines 1510, 1520, 1530 represent the reflections of the light as the light makes it way down to the photodetectors disposed in the opening 745. Based on where the light initially makes contact with the front surface 750, that light may reflect many times or only a few times before it eventually is collected and detected by the photodetectors 1410, 1420.

Figure 10:
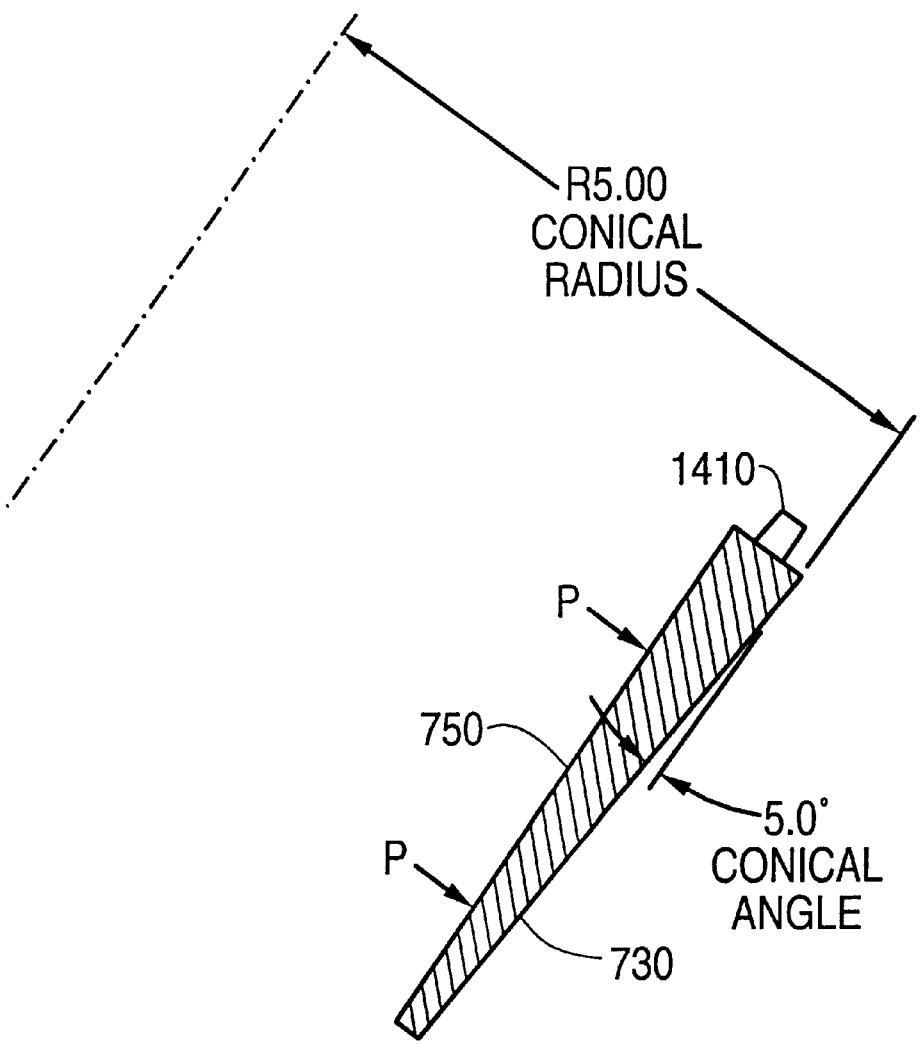
FIG. 10 shows a cross-sectional view along line 10—10 of FIG. 7.

FIG. 10 corresponds to a cross-sectional cut along line 10—10 of FIG. 7, and shows the length-wise wedge shape of the substrates 705, 710. As seen in FIG. 8, the mounting element 715 protrudes from the bottom surfaces 730, 740, to allow for connection of the collector 700 to another structure, such as a motor or a flexure, as discussed above.

FIG. 7 shows a point x1 and a point x2 that respectively is correspond to the centers or peaks of the 5" radius cones that respectively form the bottom surfaces 730, 740. The point x1 is a point nearby where a photodetector for the substrate region 705 is placed, and the point x2 is a point nearby where a photodetector for the substrate region 710 is placed.

As seen in FIG. 10, in the first embodiment the cones that form the bottom surfaces 730, 740 each have a 5" conical radius. They also have a 5° conical angle due to the wedge-shape of the substrate 700. While the wedge angle is equal to 5° in the first embodiment, it may be set to a different value while remaining within the scope of the invention. As long as the TIR constraint is met, any wedge angle that allows for this will do. For example, a wedge angle set to a value within a 5°–20° wedge angle range will work for most types of substrates. Also, the conical radius may be set to a value other than 5" while remaining within the scope of the invention, and it may be modified based on the structure and or composition of the collector 700.

The wedge shape of the collector 700 also has a secondary purpose besides its 'optics' utility. That purpose is providing a collector that has a smaller mass at a portion of the collector where a photodiode detector is positioned. That way, when the collector is positioned on a flexure along with a laser diode or the like, there will be less vibrations and other unwanted effects due to the streamlined configuration of the substrate. As a result, as the laser diode scans across a particular range by way of a flexure, the collector will follow that same scan pattern with minimal vibrations.

In the first embodiment, the substrate regions 705, 710 are made from plastic, such as acrylic. Of course, the substrates can be made of other appropriate materials, such as quartz or glass. In any case, one of ordinary skill in the art will be able to make and use the teachings of the present invention to create a collector substrate having a particular conical size and holographic grating pattern to provide for total internal reflection of light as that light makes it way to one or more photodetectors. In more detail, based on the material making up the substrate regions 705, 710, and based on the wavelength of light output by a laser diode that impinges on an object and which is collected by the collector, one of ordinary skill in the art will be able to determine the Bragg conditions at both the planar, holographic-grated front surface and the conically-wedged shaped bottom surfaces in order to construct a collector that provides for total internal reflection of light that is initially diffracted into the substrate, to thereby provide that light to one or more photodetectors.

The mounting element 715 is preferably made of a material such that light incident on the mounting element passes therethrough. Any light that is initially incident on the substrate regions 705, 710 that reflect against the mounting element 715 passes into the mounting element and is absorbed by the mounting element 715, as the mounting element 715 is preferably index-matched to substrate regions 705, 710.

While a first embodiment has been described herein, modification of the described embodiment may become apparent to those of ordinary skill in the art, following the teachings of the invention, without departing from the scope of the invention as set forth in the appended claims. For example, while the first embodiment has been described as being a wedge-shaped collector with a top surface having a holographic grating and a bottom surface having a conical shape, alternate configurations may be envisioned. For example, a first alternate configuration may include a holographic grating on the bottom surface, with that bottom surface being planar and not conical shaped. With the first alternate configuration, the top surface would also be planar, with the substrate still having a wedge shape (from 5° to 20° preferably). In that first alternate configuration, light is incident on the planar top surface, where it refracts into the collector substrate and becomes incident on the holographic grating on the bottom surface. The light is then diffracted at a particular angle back to the top surface, and the light proceeds in this manner to a photodiode detector positioned at one end of the substrate.

In a second alternate configuration, the top surface is planar, and the bottom surface has a holographic grating and where that bottom surface also has a conical shape similar to that described with respect to the first embodiment. In this second alternate configuration, the collector substrate is also wedge shaped. In both the first and second alternate configurations, the structure of the collector is such that the TIR constraint is always met for light that is incident on the collector, thereby providing that light to a photodiode detector that is positioned at a particular region of the collector.

Figure 15A:
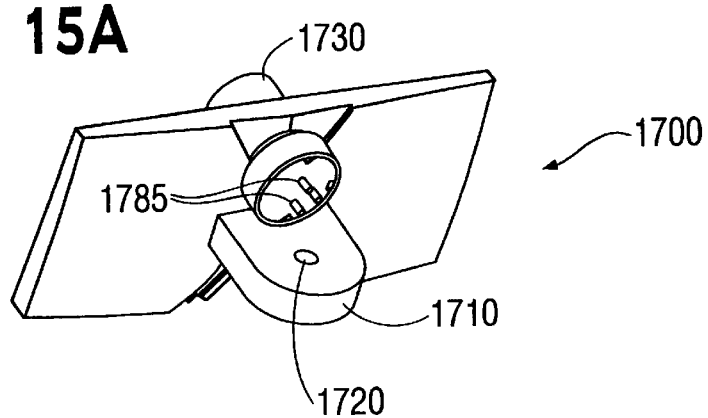
FIGS. 15A–15C respectively show a back perspective view, a front perspective view, and a cut-through view of a wedged-shaped collector according to a second embodiment of the invention.
Figure 15B:
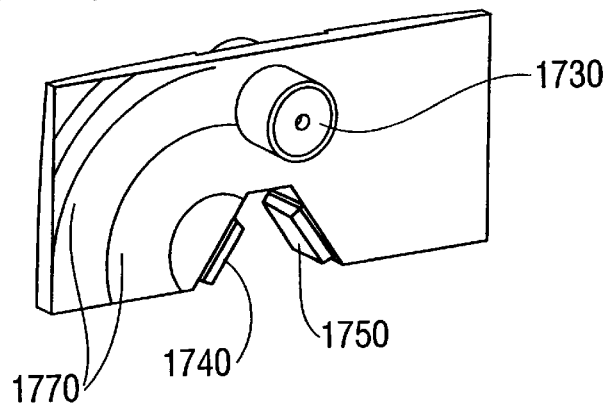
Figure 15C:
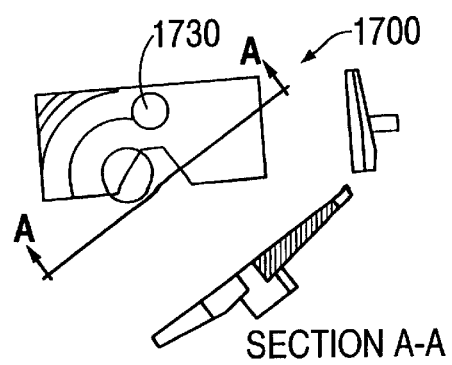

FIGS. 15A–15C respectively show a back view, a front view, and a cut-through view of a wedged-shaped collector 1700 according to a second embodiment of the present invention. The collector 1700 has a mounting unit 1710 attached on a back side thereof. The mounting unit 1710 has a hole 1720 provided therein, where a post (not shown) on a base section (not shown) of a bar code scanner is fitted into the hole, and thereby provides a pivot point for back-and-forth movement of the collector 1700. A laser light source 1730 is also disposed on a front surface of the collector 1700, and provide direct illumination of an object to the scanned. As the laser light source 1730 moves in a back-and-forth direction to provide a scanning beam across the object, the collector 1700 moves in tandem, since the laser light source 1730 is attached to the front surface of the collector 1700. Detectors 1740, 1750 are provided on the collector 1700, in a manner discussed earlier. Also, a holographic grating 1770 is provided on the front surface of the collector 1700, in a manner discussed earlier. The laser light source 1730 has a plurality of connectors 1785 that are used to provide power to the laser light source 1730.

Figure 16A:
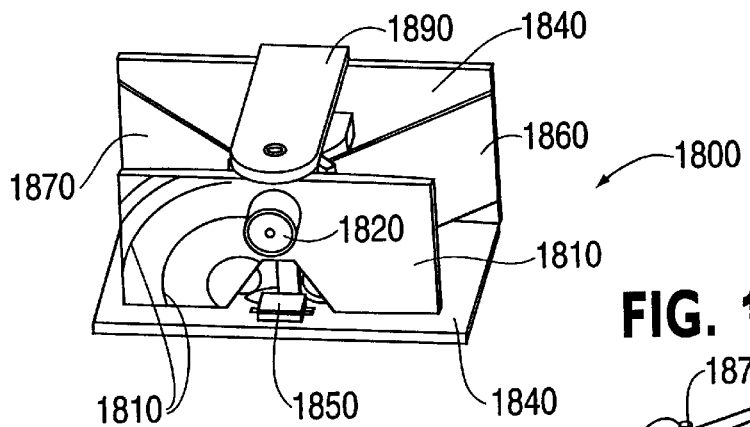
FIGS. 16A and 16B respectively show a front perspective view and a back perspective view of a rotor/base unit assembly according to a third embodiment of the invention.
Figure 16B:
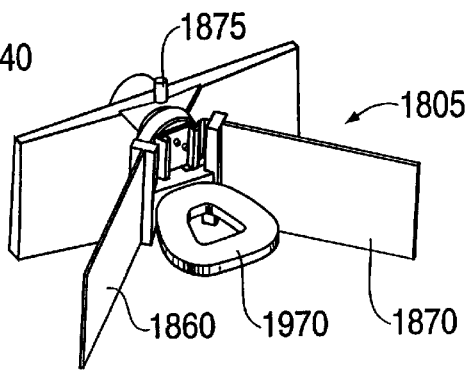

FIGS. 16A and 16B respectively show a front view from above and a back view from above of a collection system 1800 according to a third embodiment of the present invention. The collection system 1800 includes a rotor 1805 having a collector 1810 with a holographic grating 1810 on a front surface thereof, and a laser light source 1820 also disposed on a front surface thereof. The collection system 1800 also includes a stationary base section 1840, with a fixed detector 1850 provided on a bottom surface of the base section 1840. The fixed detector 1850 is an optional component of the collection system 1800. Detectors (not shown) may also be provided on a bottom portion of the collector 1810, in a manner similar to that shown in FIG. 15B. 1S The rotor 1805 is flexibly attached to the base section 1840 by way of flexures 1860, 1870. A post 1875 disposed on a top portion of the rotor 1805 fits into a hole provided in a top L-shaped portion 1890 of the base section 1840. Scanning movement of the collector 1810 and the laser light source 1820 disposed thereon is provided by way of the flexures 1860, 1870, which move in accordance with a planar electro-magnetic drive, as is known to those skilled in the art. A coil 1970 of a planar motor is shown, and is used (together with magnets disposed on the base section) to create the electromagnetic energy to cause back-and-forth movement of the flexures, in a manner known to those skilled in the art. Not shown in the figures are magnets that work with the coil 1970 to provide the electromagnetic field for back-and-forth movement of the flexures. Though not shown in FIGS. 16A and 16B, another post is provided on a bottom portion of the rotor 1805, and fits into a hole that is provided on a bottom surface of the base section 1840. By this configuration, the collector 1810 and the laser light source 1820 move in synchronism in a back-and-forth (scanning) direction by way of the flexures 1860, 1870, while the base section 1840 is stationary, and where the rotor 1805 is prevented from moving too far from its normal rotation path by virtue of the posts of the rotor, and holes of the base section 1840 in which the posts are disposed within. Such unwanted movement may be due to a shock force applied to a bar code scanner in which these elements are housed within, whereby the post/hole configuration allows for relatively smooth scanning even during a time when the shock force is applied. For example, during normal scanning operation, the posts do not contact the holes in which they are positioned. However, when a shock force is applied to the bar code scanning unit, either or both posts will move from the center of the hole in which it is disposed, and will contact a respective edge of the base section that forms the outer periphery of the hole in which the post is disposed, thereby keeping the rotation of the rotor 1805 within an allowable range of rotation.

Each hole is preferably 1–2 mm greater in diameter than the diameter of the post that is positioned within the hole, to allow for normal excursions of the rotor 1805 during a scanning operation. With these normal excursions, the posts are small enough so that they will not contact the edges of the edges of the base section that define the outer boundary of the holes. By way of example and not by way of limitation, each post is 1 mm to 2 mm in diameter, and each hole is 0.5 to 2 mm larger than the post which rotates within the hole. While it is preferable that the posts of the rotor are located at a center of rotation of the rotor with respect to the base unit, such that only rotational movement and no translational movement of the rotor results, in most configurations the post will rotate and translate during a scanning movement of the rotor. This is due in part to the flexures not providing a pure pivot for the rotor. As such, the post follows a plurality of points defining a locus of rotation during a back-and-forth scan. In the present invention, the hole is sized such that the points defining the locus of rotation of the posts stay totally within the hole and do not contact any portion of the base section during a normal scanning operation in which no shock force is applied to the bar code scanner.

In the described embodiment, the attachment of the rotor 1805 to the base section 1840 is such that the rotor 1805 deflects only under shock loading, and allows the posts on the upper and lower portions of the rotor to contact the holes that are provided on the base section 1840. The gap in the post/hole combination journal bearing) is preferably large enough for ease in manufacturing, but small enough so that during shock conditions, rotor translation is limited to maintain a useful scanning operation even during those shock conditions.

In FIGS. 16A and 16B, the flexures 1860, 1870 provide structural support for the rotor 1805. In an alternative configuration, the flexures 1860, 1870 are also configured to also supply power to the rotor 1805 via a power line disposed in one of the rotors, and to provide a feedback signal from the rotor 1805 (e.g., current position of the rotor) by way of a feedback signal disposed within another of the flexures. For example, one signal disposed within a flexure may provide photo-detector power to the rotor 1805.

Figure 17A:
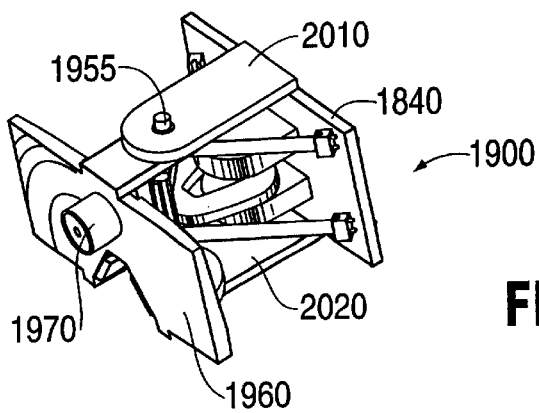
FIGS. 17A and 17B respectively show a top perspective view and a back perspective view of a rotor/base unit assembly according to a fourth embodiment of the invention.
Figure 17B:
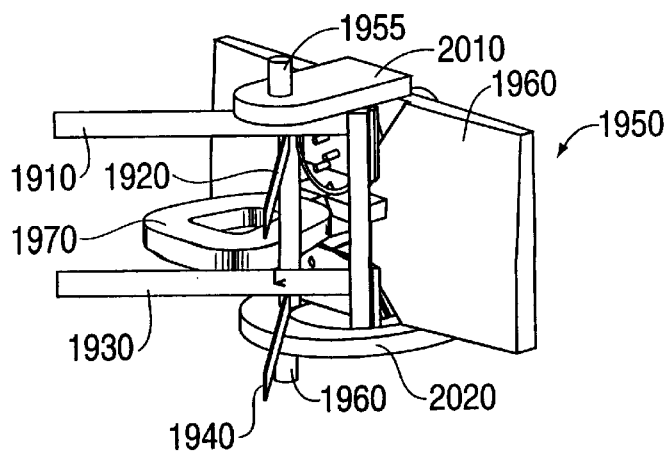

FIGS. 17A and 17B respectively show a top perspective view and a back perspective view of a collection system 1900 according to a fourth embodiment of the present invention. Flexures 1910, 1920, 1930, and 1940 are disposed in an "X-shaped" pattern, and provide for back-and-forth scanning movement of a rotor 1950. Rotor 1950 includes a collector 1960 with a holographic grating disposed on a front surface thereof, and a laser light source 1970 disposed on the front surface as well. The rotor 1950 includes a top post 1955 and a bottom post 1960, which respectively are fitted into a top L-shaped portion 2010 and a bottom L-shaped portion 2020, as shown best in FIG. 18. The size of the posts and the holes are in accordance with that described with reference to FIGS. 16A and 16B. The flexures 1910–1940 move by way of planar electromagnetic drive, or by other methods, such as by use of bi-morphs for the flexures and providing electrical signals thereto, in a manner known to those skilled in the art. Like the other embodiments, the flexures 1910–1940 may be configured to also provide electrical and power signals to the rotor 1950 and monitoring signals from the rotor 1950.

Figure 18:
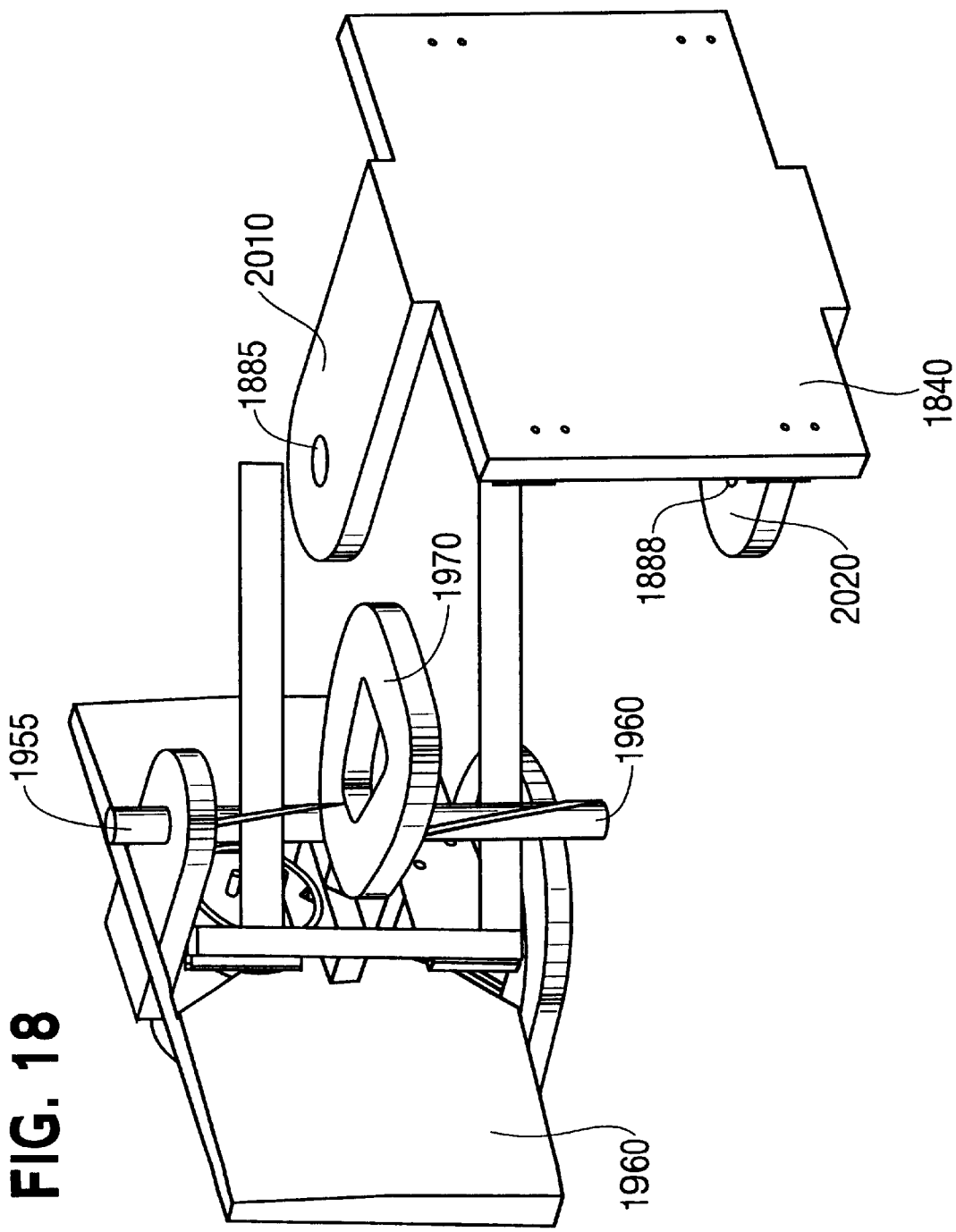
FIG. 18 shows an exploded view of the rotor/base unit assembly according to the fourth embodiment of the invention.

FIG. 18 shows an exploded view of the X-shaped flexure configuration, with rotor 1950 and the base section 1840 separated from each other. FIG. 18 shows each of the two holes 1885, 1888 on respective top and bottom L-shaped portions 2010, 2020 of the base section 1840. FIG. 18 also shows posts 1955, 1960 respectively disposed on top and bottom portions of the rotor 1950. Although L-shaped extensions having holes for receiving the posts are shown and described, other types of extensions for a base section may be envisioned by those skilled in the art, with the only proviso being that the posts of the rotor section fit into holes provided on oppositely-positioned portions of the base section.

While the second, third and fourth embodiments have been described with respect to a wedged-shaped collector as discussed earlier in this application, other types of collectors, such as conventional collectors, may be utilized with the post/hole pivot arrangement of the third and fourth embodiments, while remaining within the scope of the invention as described herein.

What is claimed is:

1. A collector for an optical scanner, comprising:

a substrate having a first side and a second side, the first side situated so that return light is initially received by the collector at the first side;

a holographic grating disposed on the first side of the substrate, wherein the second side is angled with respect to the first side so that the substrate is wedged shaped, the second side also having a conical surface, wherein light that is incident onto the first side of the substrate diffracts inside the substrate to the second side, and wherein the light is totally internally reflected within the substrate to a particular location of the substrate where the light is collected.

2. The collector according to claim 1, further comprising a detector coupled to one end of the substrate, the detector configured to detect the light that has been totally internally reflected within the substrate.

3. The collector according to claim 1, wherein the substrate is formed from a transparent plastic material.

4. The collector according to claim 1, wherein the holographic grating of the substrate is formed to cause an angle of diffraction of the return light as it initially passes into the substrate.

5. The collector according to claim 1, wherein the substrate has a wedge angle of between 5 degrees and 20 degrees for the second side.

6. The collector according to claim 1, wherein the holographic grating is one of embossed, etched and laminated onto the first side of the substrate.

7. The collector according to claim 1, wherein the first side is a substantially planar surface with the holographic grating provided thereon.

8. The collector according to claim 6, wherein the holographic grating includes a plurality of cylindrical interference fringe patterns.

9. A collector for an optical scanner, comprising:

a substrate having a first side and a second side, the first side receiving reflected, substantially parallel light from a scanned object, the first side being angled with respect to the second side so that the substrate is wedged shaped; and a holographic grating affixed to the first side of the substrate, the second side having a conical shape, wherein the substantially parallel light that is incident on the first side of the substrate is diffracted into the substrate by the holographic grating and towards the second side, and wherein the substantially parallel light is reflected from the second side of the substrate at a particular angle due in part to the conical wedge shape so as to maintain the substantially parallel light within the substrate as the substantially parallel light makes further reflections within the substrate.

10. The collector according to claim 9, further comprising a detector positioned to receive the substantially parallel light that has made the further reflections within the substrate and has passed out of the substrate.

11. The collector according to claim 9, wherein the substrate is formed from a transparent plastic material.

12. The collector according to claim 9, wherein the holographic grating provided on the first side causes a direction of travel of the substantially parallel light within the substrate to be diffracted at a particular angle with respect to a direction of travel of the substantially parallel light outside the substrate.

13. The collector according to claim 9, wherein the holographic grating is one of laminated, etched and embossed onto the first side of the substrate.

14. The collector according to claim 9, wherein the first side is a substantially planar surface with the holographic grating provided thereon.

15. A method of collecting return light that is based on light provided in a direction of an object and that has reflected off the object as the return light, the method comprising the steps of:

a) initially receiving the return light by a holographic-grated front surface of a collector, the return light being diffracted into the collector at an angle within a fixed range of diffraction angles;

b) thereafter receiving diffracted return light by a conically-shaped back surface of the collector, the diffracted return light being reflected back towards the front surface, wherein a conical angle of the back surface is set such that the return is reflected back and forth between the front and back surfaces and eventually towards a light detection region of the collector.

16. The method according to claim 15, wherein the conical angle of the back surface is within a range of from 5 degrees to 20 degrees.

17. A collector for an optical scanner, comprising:

a substrate having a first side and a second side, the first side situated so that return light is initially received by the collector at the first side;

a holographic grating disposed on one of the first side and the second side of the substrate; and a photodetector that is coupled to the substrate and that collects light that is internally reflected within the substrate to a location at which the photodetector is disposed, wherein the second side is angled with respect to the first side so that the substrate is wedged shaped, wherein the other of the first side and the second side has a conical surface.

* * * * *